US007055835B2

(12) United States Patent
Wu

(10) Patent No.: US 7,055,835 B2
(45) Date of Patent: Jun. 6, 2006

(54) SUSPENSION STRUCTURE FOR FRONT WHEEL ASSEMBLY OF WHEELCHAIR

(75) Inventor: Daniel P. H. Wu, Hsin-Feng Hsiang (TW)

(73) Assignee: PI Hsiang Machinery mfg. Co., Hsinchu (TW)

( * ) Notice: Subject to any disclaimer, the term of this patent is extended or adjusted under 35 U.S.C. 154(b) by 261 days.

(21) Appl. No.: 10/700,432

(22) Filed: Nov. 3, 2003

(65) Prior Publication Data

US 2004/0251649 A1 Dec. 16, 2004

(30) Foreign Application Priority Data

Jun. 13, 2003 (TW) .............................. 92210808 U

(51) Int. Cl.
*B60B 33/00* (2006.01)

(52) U.S. Cl. ............................ 280/86.1; 280/124.128; 280/250.1

(58) Field of Classification Search ............... 280/86.1, 280/124.116, 124.125, 124.128, 250.1, 755, 280/650, 657, 79.2, 47.25, 47.38, DIG. 4; 16/44; B60B 33/00
See application file for complete search history.

(56) References Cited

U.S. PATENT DOCUMENTS

| | | | | |
|---|---|---|---|---|
| 4,000,912 | A * | 1/1977 | Donald et al. | 280/86.1 |
| 6,079,725 | A * | 6/2000 | Lazaros | 280/250.1 |
| 6,244,025 | B1 * | 6/2001 | Ferris et al. | 56/15.8 |
| 6,460,641 | B1 * | 10/2002 | Kral | 180/24.02 |
| 6,543,798 | B1 * | 4/2003 | Schaffner et al. | 280/250.1 |
| 2004/0168839 | A1 * | 9/2004 | Wu | 180/65.1 |

* cited by examiner

*Primary Examiner*—David R. Dunn
*Assistant Examiner*—Drew Brown
(74) *Attorney, Agent, or Firm*—Charles E. Baxley

(57) ABSTRACT

A suspension structure for a front wheel assembly of a wheelchair generally includes struts of front wheel assemblies disposed at corresponding mounting brackets on the frame of the wheelchair. The struts will rotate upward about the corresponding jockey wheels when the jockey wheels are passing an obstacle, and meanwhile it will effect an uplift of the front end of the frame of the wheelchair. As a result, the gravity center of the user will be shifted backward so as to reduce the load on the jockey wheels, by this way, the jockey wheels may traverse the obstacle without difficulties. Furthermore, the suspension for the front wheel assembly of a wheelchair is simply structured so as to facilitate the assembly and reduce the production cost as well.

4 Claims, 10 Drawing Sheets

SUSPENSION STRUCTURE FOR FRONT WHEEL ASSEMBLY OF WHEELCHAIR

FIELD OF THE INVENTION

The present invention relates to a suspension structure for a front wheel assembly of a wheelchair, and more particularly to a suspension structure for a front wheel assembly of a wheelchair that is capable of saving production cost with its simple structure as well as reducing the kinetic energy dissipation to the least.

DESCRIPTION OF THE PRIOR ARTS

Referring to FIG. 1, a conventional suspension structure of a wheelchair generally includes a frame 10 provided with a driving wheel 11 at both sides thereof respectively, and the driving wheel 11 is driven by a motor 12. At either side of the frame 10 is further defined an ear member 13 that is pivotally connected with a first connecting rod 14. The connecting rod 14 has an end connected to the motor 12 and has another end protruded ahead of the frame 10. Furthermore, a mounting bracket 15 is defined at both sides of the front end of the frame 10 respectively and at the end of the mounting bracket 15 is installed a jockey wheel 16. A side of the mounting bracket 15 is connected to the front end of the connecting rod 14 by a connecting plate 17, furthermore, a plurality of rollers 171 are disposed in the connecting plate 17, so as to allow the mounting bracket 15 to rotate relative to the connecting rod 14.

By such arrangements, the mounting bracket 15 is able to rotate upward when the jockey wheels 16 are traversing an obstacle, and the connecting rod 14 will rotate downward by virtue of the connecting plate 17 and the rollers 171. Therefore, the load on the driving wheels 11 and the friction of the driving wheels 11 with respect to the road will be increased. In this way, the driving wheels 11 can get enough force to push the jockey wheels 16 over the obstacle. However, this conventional suspension structure for a jockey wheel of wheelchair still has some defects that need to be improved:

First, upon encountering an obstacle, the connecting rod 14 will actuate to increase the load on the driving wheels 11, so as to make the driving wheels 11 push the jockey wheels 16 over the obstacle. However, this method of traversing the obstacle will consume a lot of energy of the motor 12.

Second, the structure conventional front wheel suspension is too complicated since the connecting rods 14 and the connecting plate 17 must be connected to the driving wheels 11 and to the mounting bracket 15, respectively, and the connecting plate 17 has to be equipped with rollers 171, it is not only complicated in structure but also will increase the production cost.

The present invention has arisen to mitigate and/or obviate the afore-described disadvantages of the conventional suspension structure for front wheel assembly of a wheelchair.

SUMMARY OF THE INVENTION

The primary object of the present invention is to provide a suspension structure that has front wheel assemblies disposed at corresponding brackets of a frame of wheelchair, wherein the front wheel assemblies will rotate upward about the corresponding jockey wheels upon encountering a curb or other obstacle of the like, this will effect an uplift of the front end of the frame of wheelchair, and meanwhile the gravity center of the user and the frame of the wheelchair will move backward, so as to reduce the load on the jockey wheels, by this way, the jockey wheels of the wheelchair are able to climb over the curb without difficulties. Since the wheelchair traverses the curb through the movement of the user's gravity center, this method enables the wheelchair of the present invention to traverse the curb with the least kinetic energy.

Another object of the present invention is to provide a suspension structure for a front wheel assembly of a wheelchair, which is capable of traversing a curb or other obstacle of the like without difficulties, furthermore, it is simply structured relative to conventional wheelchair so as not only to facilitate the assembly but reduce the production cost as well.

The present invention will become more obvious from the following description when taken in connection with the accompanying drawings, which shows, for purpose of illustrations only, the preferred embodiments in accordance with the present invention.

DETAILED DESCRIPTION OF THE PREFERRED EMBODIMENTS

Figure 1:
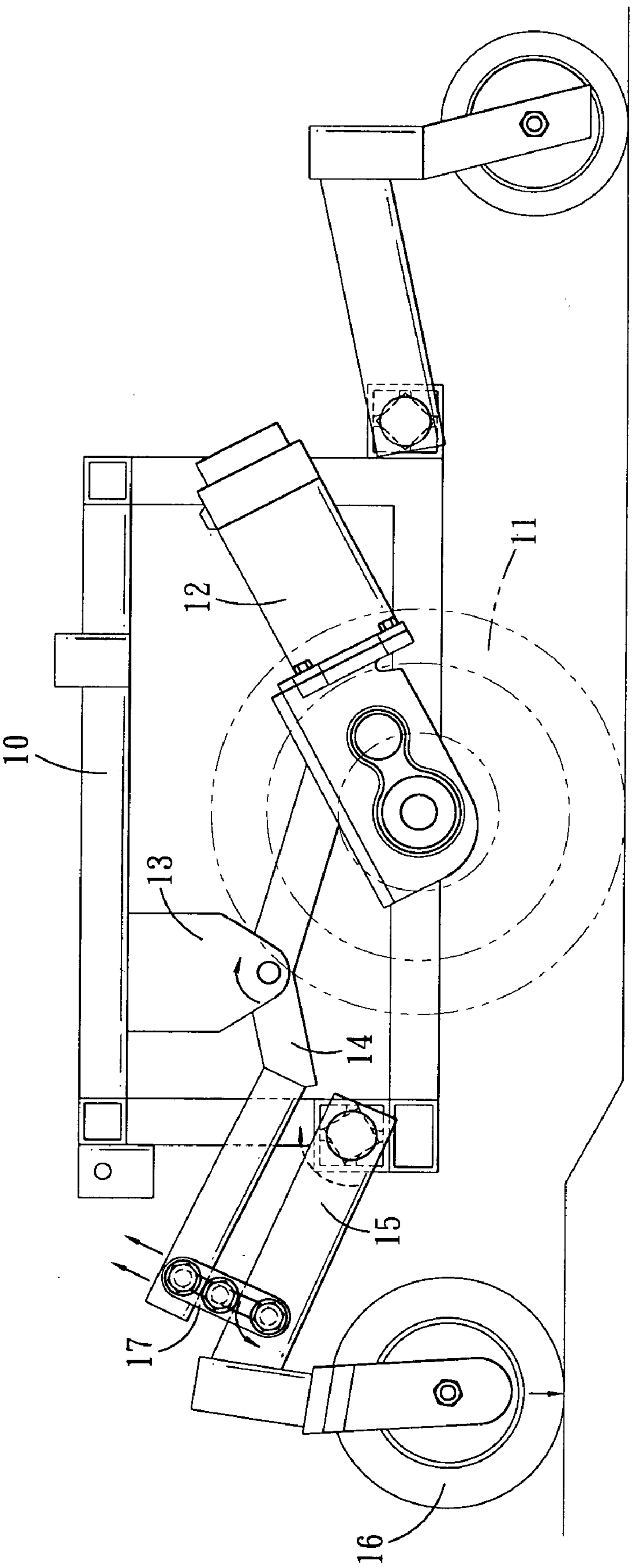
FIG. 1 PRIOR ART
FIG. 1 is a side view of a conventional suspension structure for a front wheel assembly of a wheelchair.
Figure 2:
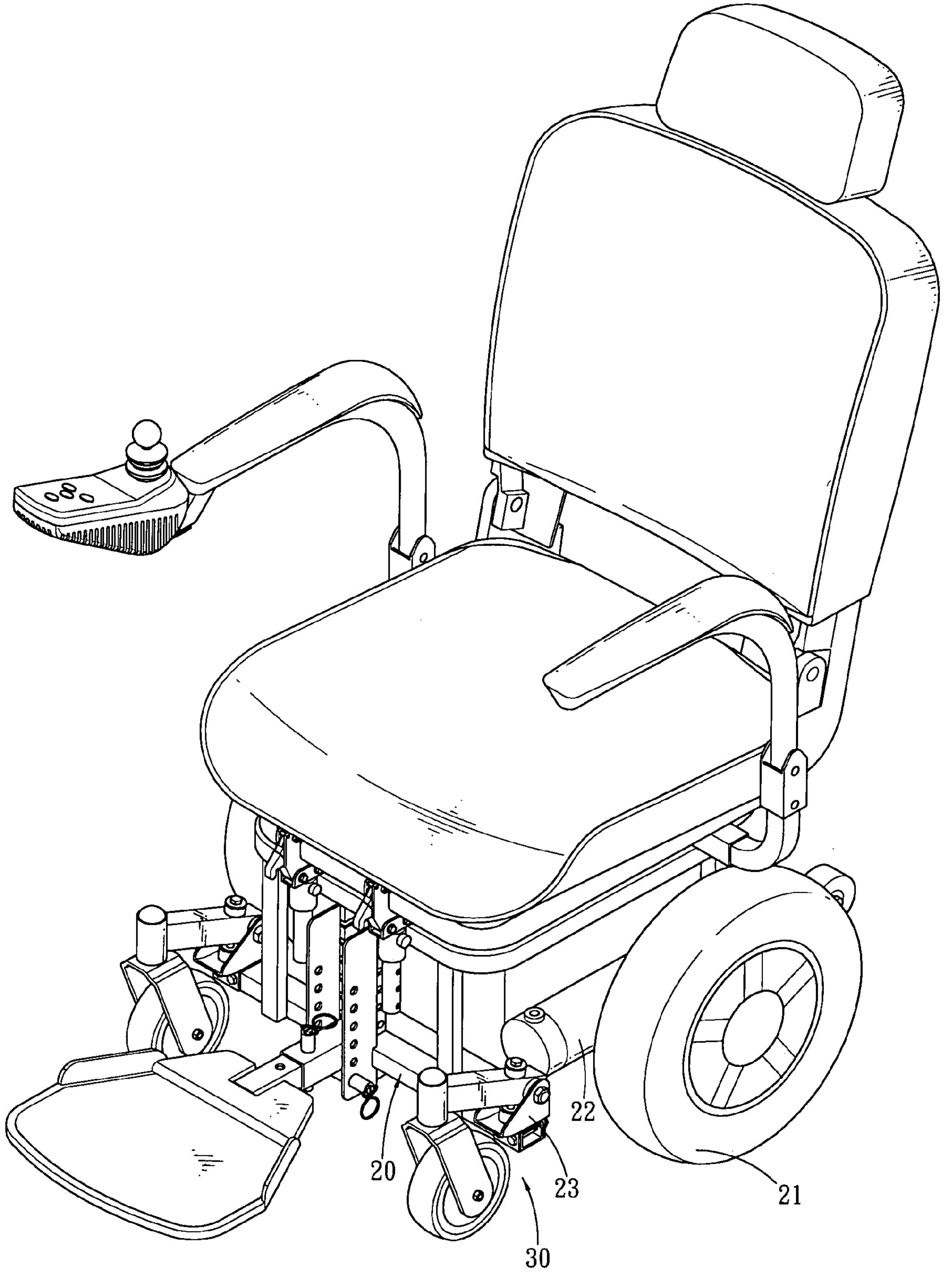
FIG. 2 is a perspective assembly view of a suspension structure for a front wheel assembly of a wheelchair in accordance with the present invention.
Figure 3:
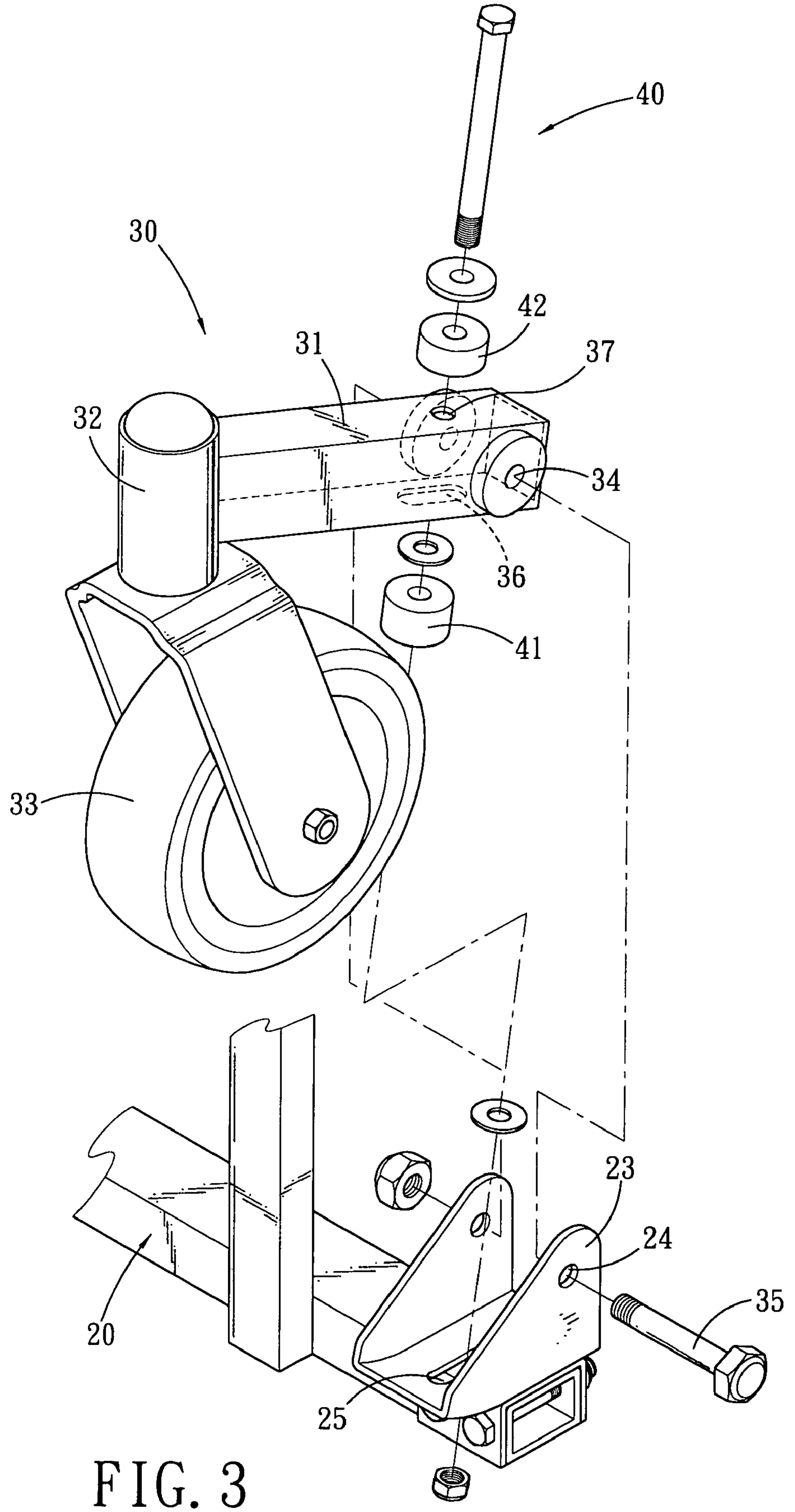
FIG. 3 is an exploded view of the suspension structure for a front wheel assembly of a wheelchair in accordance with the present invention.
Figure 4:
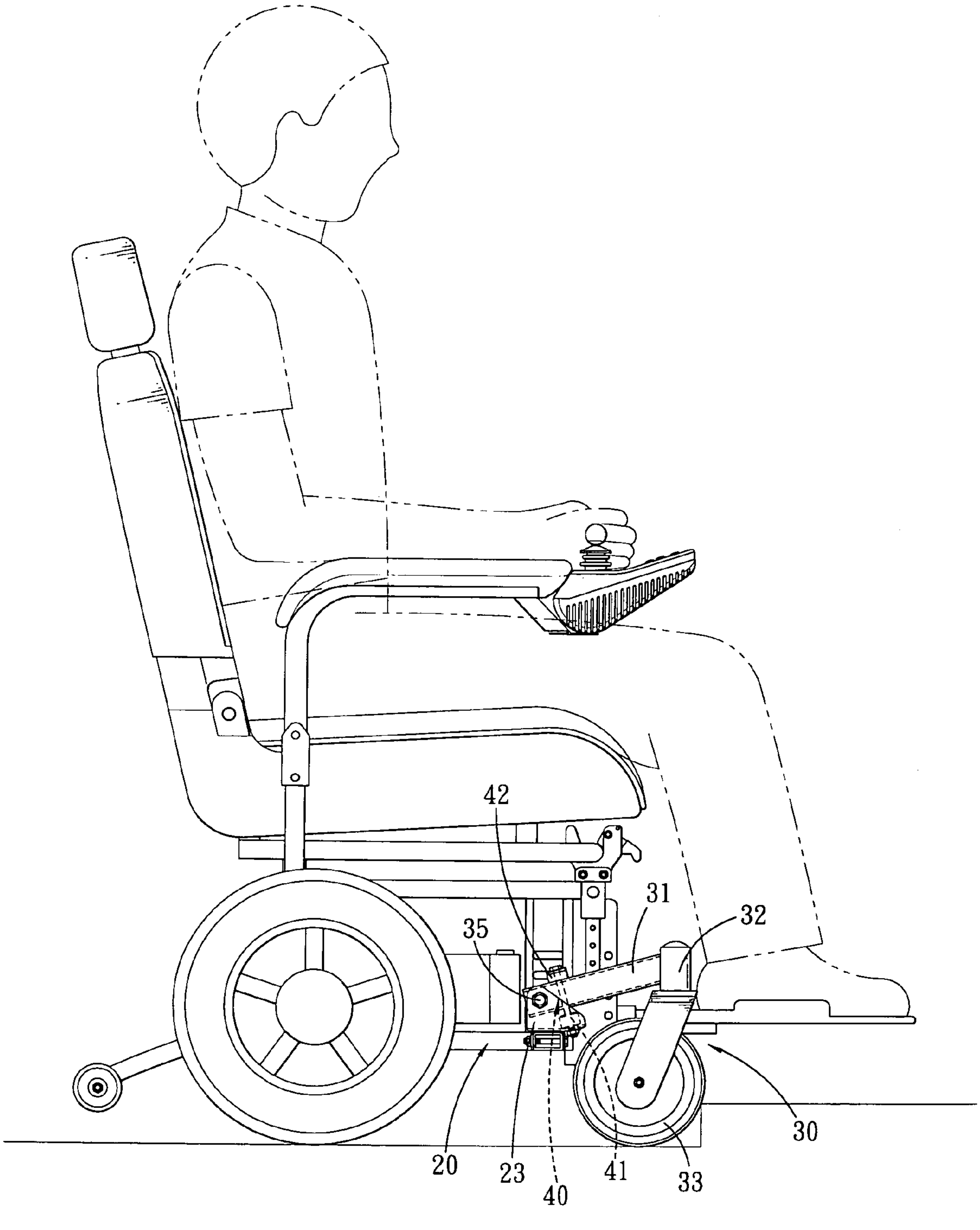
FIG. 4 is an illustrative view of showing the performance of suspension structure of the present invention for a front wheel assembly of a wheelchair upon encountering a curb.

Referring to FIGS. 2–3, which show a preferred embodiment of the present invention, in which, a pair of front wheel assemblies 30 is installed on a frame 20 of a wheelchair by virtue of positioning bolts 40, on each side of the frame 20 is installed a driving wheel 21, and a motor 22 is used to rotate the driving wheel 21.

The frame 20 is provided at either side thereof with a mounting bracket 23 in the mounting bracket 23 is defined a pair of holes 24 and in the bottom of the mounting bracket 23 is formed a slot 25. The driving wheels 21 are located at the rear portion of the frame 20.

Each of the front wheel assemblies 30 includes a jockey wheel 33 disposed at the front end of a strut 31 by virtue of a pedestal 32. At both sides of the rear end of the strut 31 is formed two opposite holes 34 to be aligned to the holes 24 in the mounting brackets 23 of the frame 20. A bolt 35 is applied to insert in the holes 24 of each mounting bracket 23 and those holes 34 of the corresponding strut 31. In the bottom of the rear end of the strut 31 is formed a slot 36 that is to be aligned to the slot 25 in the mounting bracket 23 of the frame 20, and in the top surface of the strut 31 is formed a locating hole 37 aligned to the slot 36.

The positioning bolts 40 each is inserted in the locating hole 37 and the slot 36 of the front wheel assembly 30 and the slot 25 of the mounting bracket 23 of the frame 20. A rubber ring 41 is mounted onto the positioning bolt 40 and located between the mounting bracket 23 of the frame 20 and the strut 31 of the front wheel assembly 30. And on the positioning bolt 40 is further mounted another rubber ring 42 located above the locating hole 37 of the front wheel assembly 30.

Figure 5:
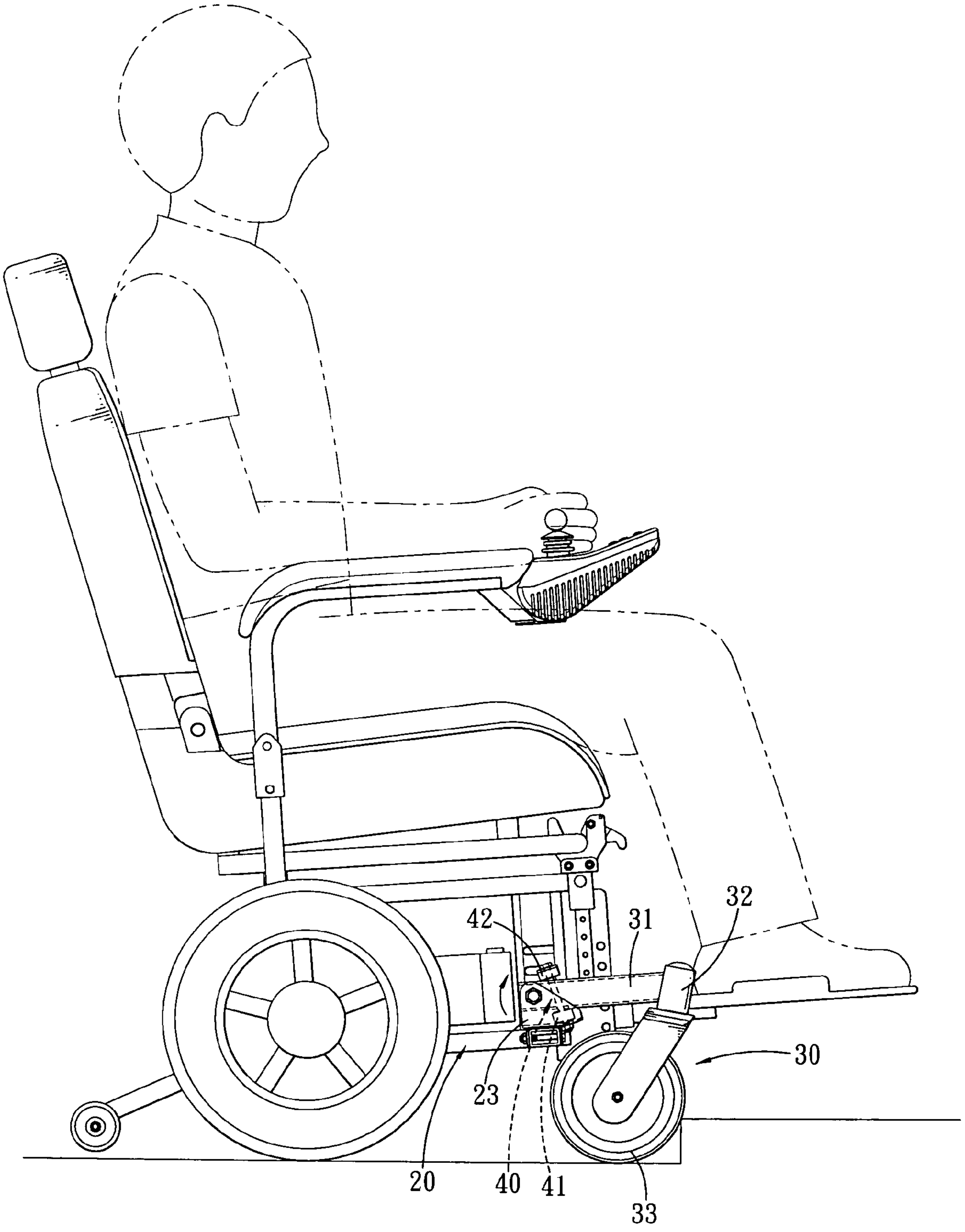
FIG. 5 is another illustrative view of showing the performance of suspension structure of the present invention for a front wheel assembly of a wheelchair upon encountering a curb.
Figure 6:
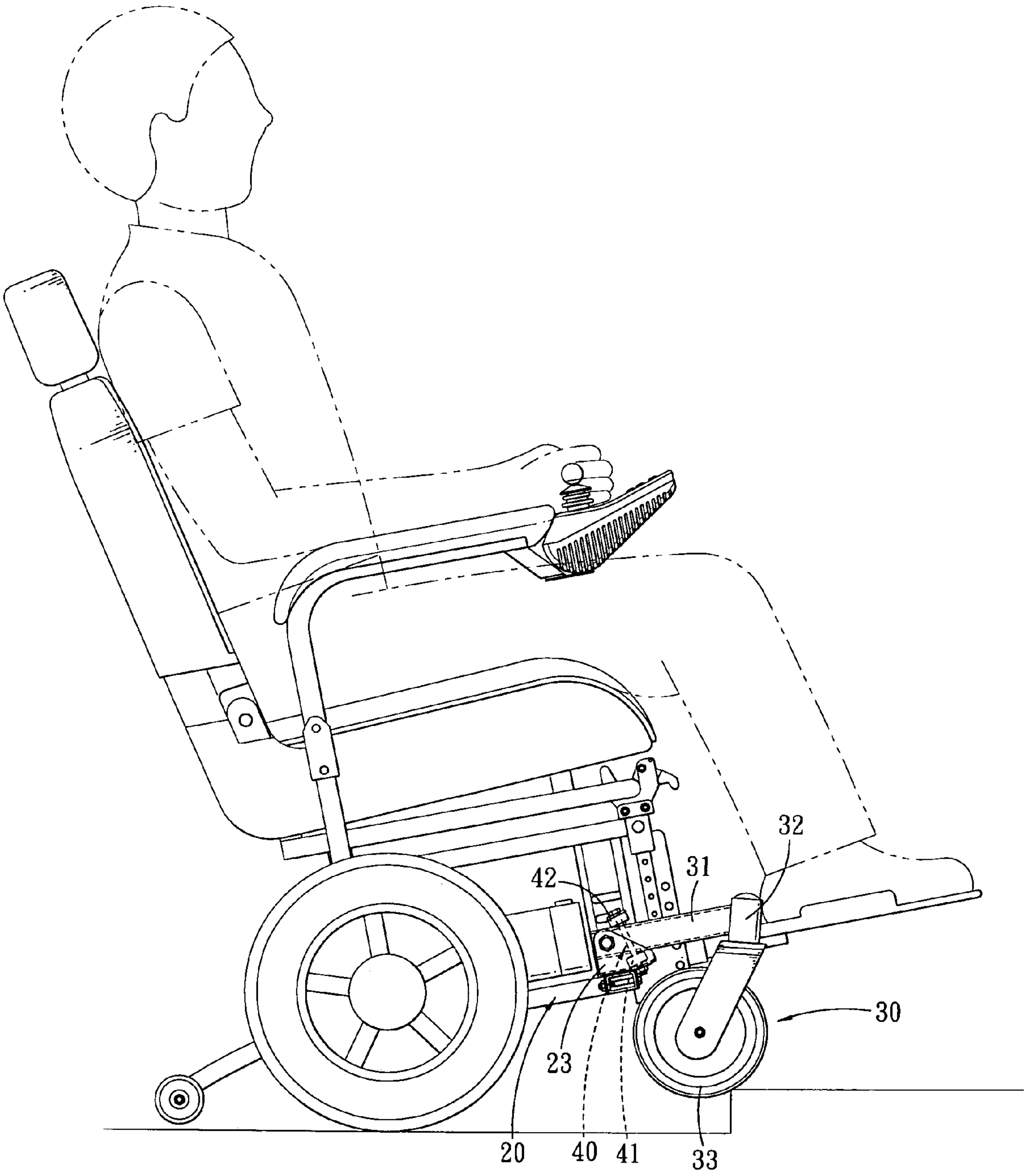
FIG. 6 is a third illustrative view of showing the performance of suspension structure of the present invention for a front wheel assembly of a wheelchair upon encountering a curb.
Figure 7:
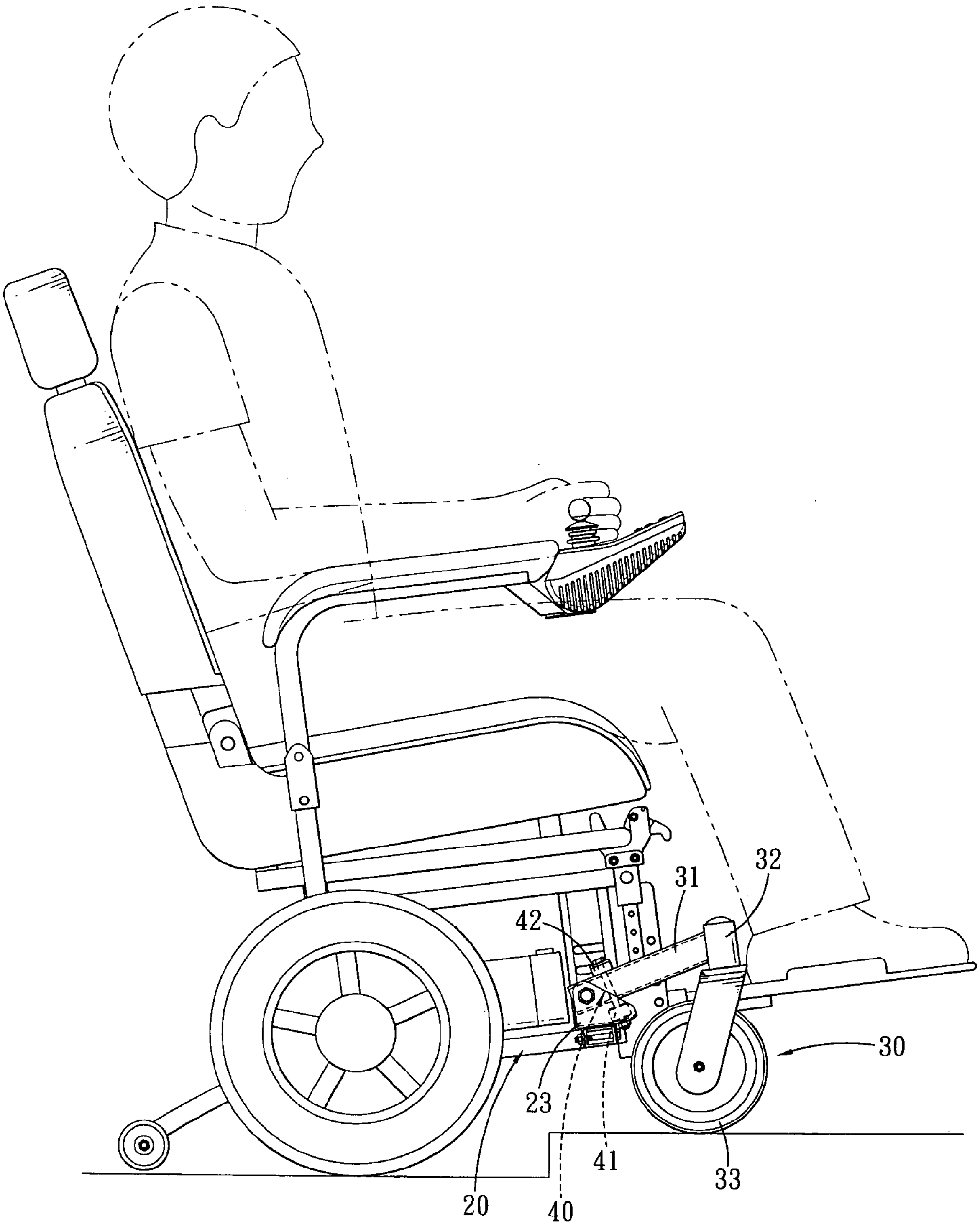
FIG. 7 is a fourth illustrative view of showing the performance of suspension structure of the present invention for a front wheel assembly of a wheelchair upon encountering a curb.

Referring to FIGS. 4–7, when the wheelchair runs on a smooth road, the weight of the user and the wheelchair will be equally loaded on the two driving wheels 21 and the jockey wheels 33 of the front wheel assemblies 30. However, the jockey wheels 33 of the front wheel assemblies 30 will stop rotating once encountering an obstacle. However, the two driving wheels 21 will keep rotating forward, thus the strut 31 of the front wheel assembly 30 will rotate about upwardly around the jockey wheel 33. Since the strut 31 of the front wheel assembly 30 is disposed on the mounting bracket 23 of the frame 20, the upward rotation of the strut 31 of the front wheel assembly 30 will cause an upward movement of the front end of the frame 20 (as shown in FIG. 5). After the front end of the frame 20 moves upward, the frame 20 will tilt backward, and the user will tilt backward along with the frame 20. It will be noted that, at this moment, the gravity center of the user and that of the frame 20 will load on the paired driving wheels 21, such that the weight on the jockey wheel 33 of the front wheel assembly 30 is lightened. Therefore, the jockey wheel 33 of the front wheel assembly 30 can traverse the obstacle without difficulty because it is driven by the forward rotation of the jockey wheel 33 of the front wheel assembly 30 (as shown in FIG. 6). After the jockey wheel 33 of the front wheel assembly 30 climbs over the obstacle, the weight of the user and the frame 20 will move forward, so as to increase the load on the mounting brackets 23 of the frame 20. At the same time, the rubber ring 42 above the locating hole 37 of the strut 31 can alleviate the shock caused by an increased load on the mounting brackets 23 of the frame 20. It will be noted that the rubber ring 42 is not a necessary element, since it only plays a role of a buffer (as shown in FIG. 7).

Thereby, according to the present invention, when the jockey wheel 33 of the front wheel assembly 30 encounters an obstacle, the strut 31 of the front wheel assembly 30 will rotate upwardly about the jockey wheel 33 and this will cause an upward movement of the front end of the frame 20. At the same time, the gravity of the user as well as the frame 20 will move backward so as to alleviate the load on the jockey wheel 33, thus enabling the jockey wheel 33 of the front wheel assembly 30 to traverse the obstacle more easily. In other words, unlike the conventional wheelchair that overcomes the obstacle totally relying on the strong propulsion of the driving wheels 21, the wheelchair of the present invention can traverse the obstacle more easily by shifting the gravity center of the user. The movement of the gravity center of the user can reduce the load on the front wheel assembly 30, so as to enable the driving wheels 21 to move forward, thus reducing the energy dissipation of the driving wheels 21.

Figure 8:
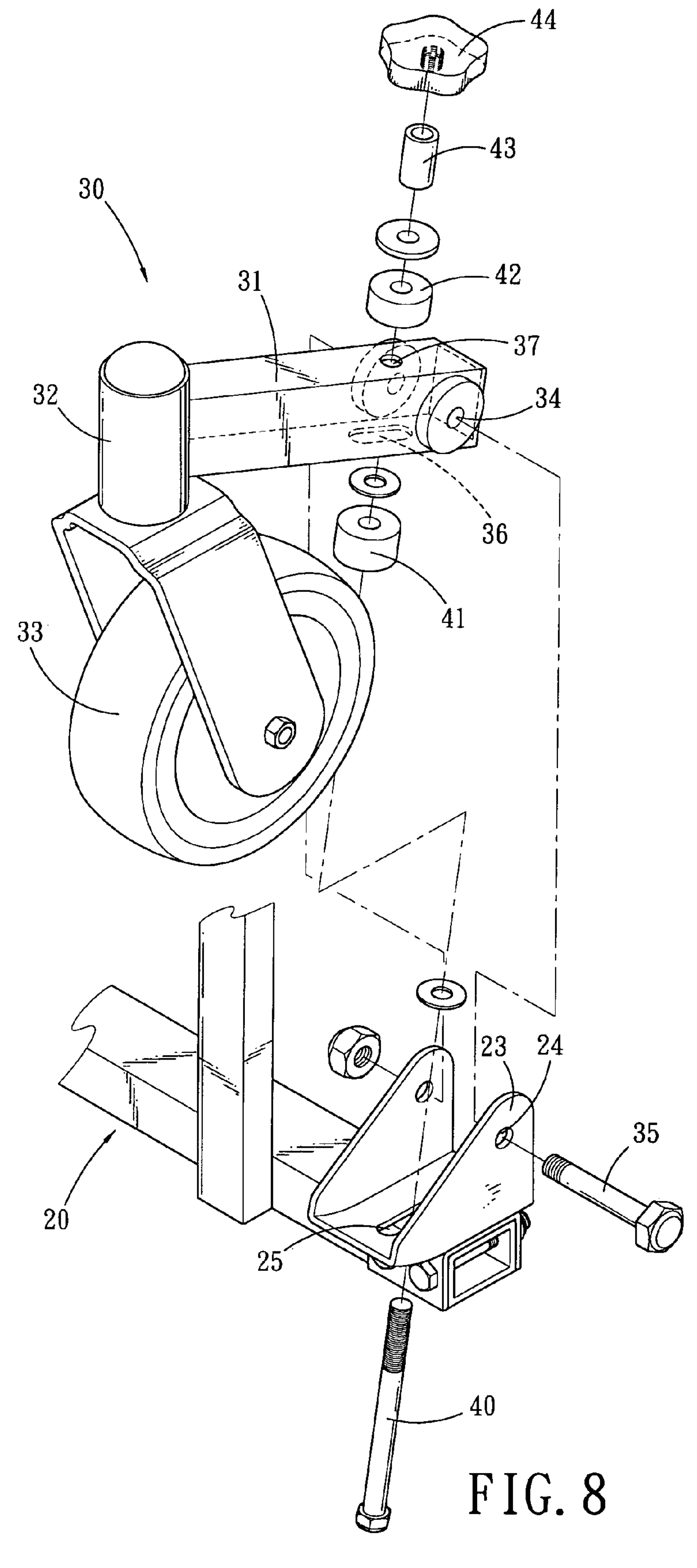
FIG. 8 is an exploded view of the suspension structure for a front wheel assembly of a wheelchair in accordance with another embodiment of the present invention.
Figure 9:
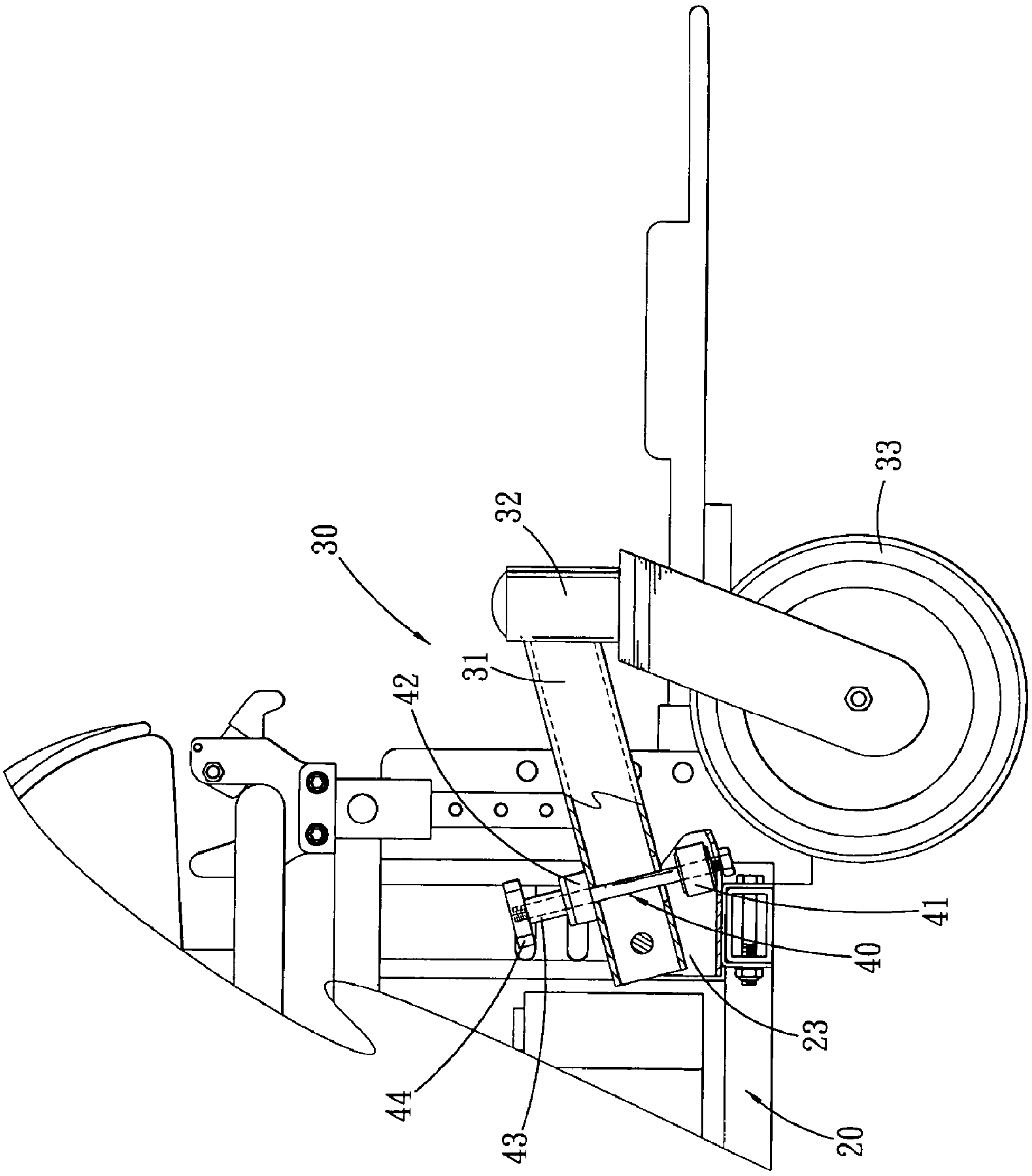
FIG. 9 is a plan assembly view of FIG. 8.

Referring to FIGS. 8–9, which show a suspension structure of a front wheel assembly of a wheelchair in accordance with another embodiment of the present invention, wherein the positioning bolt 40 can be inserted upward through the slot 25 of the mounting bracket 23, the rubber ring 41, the locating holes 37, the slot 36 of the front wheel assembly 30 and the rubber ring 42 respectively, and then a sleeve 43 is mounted onto the top end of the positioning bolt 40 and finally locked by an adjusting screw nut 44. By such a manner, the length of the positioning bolt 40 may be adjusted by rotating the adjusting screw nut 44. The sleeve 42 of the positioning bolt 40 is moved by rotating the adjusting screw nut 44, such that the user is able to adjust the elastic force of the rubber rings 41, 42 of the positioning bolt 40 on the basis of his/her own weight. For instance, for a heavy weight user, he/she may unloose the adjusting screw nut 44 moderately so as to lengthen the operation range of the positioning bolt 40 (the rubber rings are under a light pressure), vice versa, the light weight user may shorten the operation range of the positioning bolt 40, so as to make the riding comfortable.

Figure 10:
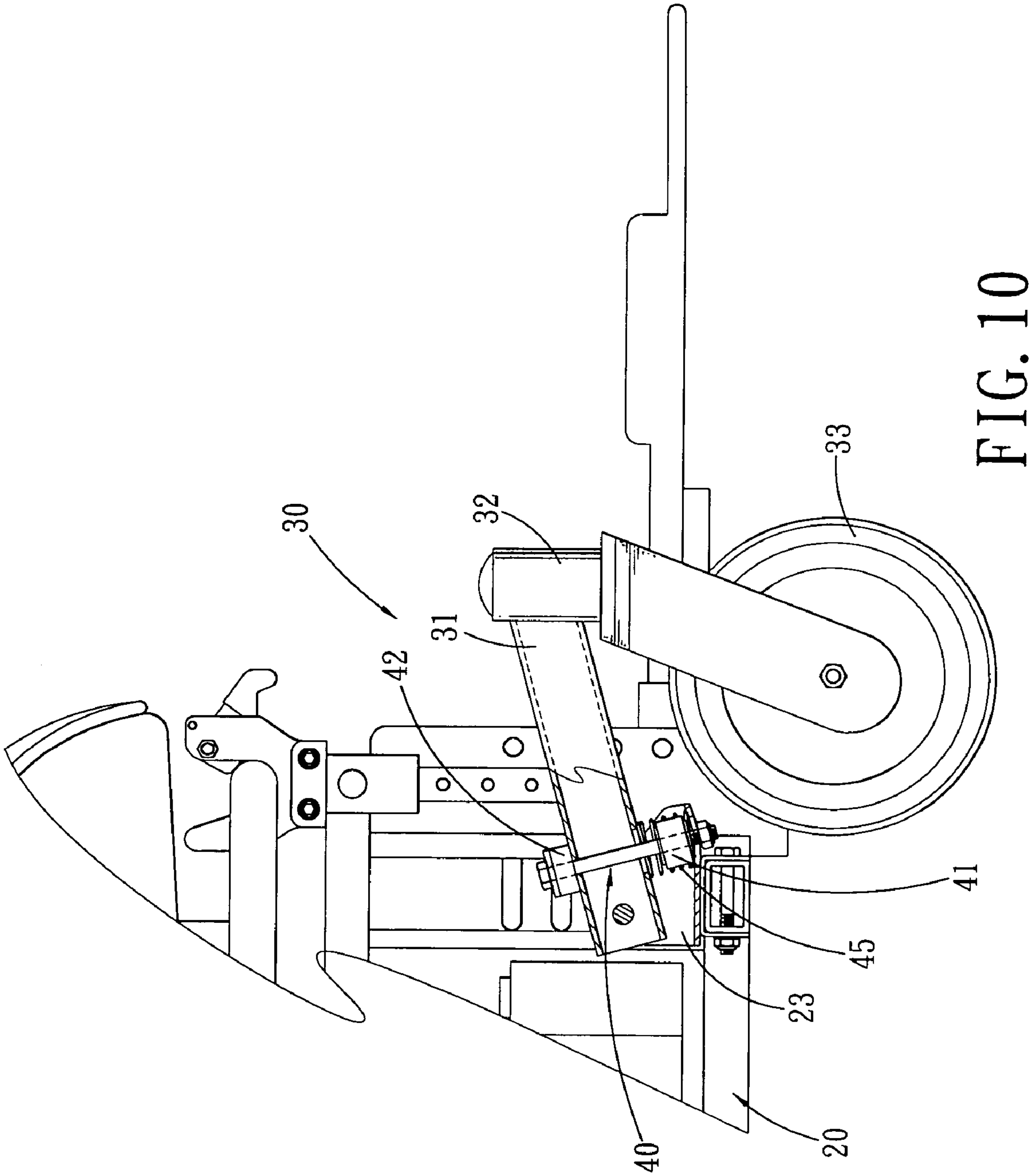
FIG. 10 is another plan assembly view of FIG. 8.

Referring to FIG. 10, wherein the positioning bolt 40 can be provided at the external periphery thereof with a spring 45, so as to prevent the strut 31 of the front wheel assembly from swaying up and down when moving the wheelchair, furthermore, it is able to increase the elastic force of the rubber ring 41.

While we have shown and described various embodiments in accordance with the present invention, it should be clear to those skilled in the art that further embodiments may be made without departing from the scope of the present invention.

What is claimed is:

1. A suspension structure for a front wheel assembly of a wheelchair comprising:

a frame provided with a mounting bracket at both sides thereof respectively, in each mounting bracket defined with a pair of holes and in a bottom of the mounting bracket formed a slot;

a pair of front wheel assemblies, each of which includes a jockey wheel disposed at a first end of a strut by virtue of a pedestal, at both sides of a second end of the strut defined with a hole respectively, at another two sides of the second end of the strut defined with a locating hole and a slot respectively, the holes in the struts are aligned to the holes in the mounting brackets, the slot and the locating hole in the struts are aligned to the slot in the mounting bracket;

a pair of positioning bolts serving to insert in the locating hole and the slot of the corresponding front wheel assembly as well as the slot in the corresponding mounting bracket of the frame, each of which has two ends, whereby to limit the upward rotation of the strut of the front wheel assemblies with respect to the mounting bracket of the frame.

2. The suspension structure for a front wheel assembly of a wheelchair as claimed in claim 1, wherein a rubber ring is mounted onto each positioning bolt and located between the mounting bracket of the frame and the front wheel assembly, and another rubber ring is mounted onto the positioning bolt and located above the locating hole of the strut, whereby to buffer the rotation of the strut of the front wheel assembly.

3. The suspension structure for a front wheel assembly of a wheelchair as claimed in claim 1, wherein each of the positioning bolts of the front wheel assembly is provided at a top end thereof with a sleeve and the sleeve is locked to the positioning bolts by an adjusting screw nut, by rotating the adjusting screw nut whereby to effect movement of the positioning bolt, such that the user can adjust the elastic force of the rubber rings on the strut of the front wheel assembly based on the weight of the occupant.

4. The suspension structure for a front wheel assembly of a wheelchair as claimed in claim 2, wherein the rubber ring between the strut of the front wheel assembly and the mounting bracket of the wheelchair are further provided with a spring at the outer periphery thereof, whereby to prevent the strut of the front wheel assembly from swaying up and down when moving the wheelchair.

* * * * *